United States Patent

Yamada et al.

[11] Patent Number: 6,041,877
[45] Date of Patent: Mar. 28, 2000

[54] DRIVE UNIT FOR HYBRID VEHICLE

[75] Inventors: Takemasa Yamada, Niiza; Fujio Matsui, Sagamihara; Shihomi Hiroishi, Mitaka; Kenzo Komatsu, Yamato, all of Japan

[73] Assignee: Fuji Jukogyo Kabushiki Kaisha, Tokyo-To, Japan

[21] Appl. No.: 08/721,657

[22] Filed: Sep. 27, 1996

[30] Foreign Application Priority Data

Sep. 29, 1995 [JP] Japan ..................................... 7-253983

[51] Int. Cl.[7] .................................................. B60K 6/04
[52] U.S. Cl. ........................................ 180/65.2; 180/242
[58] Field of Search ............................... 180/65.2, 65.3, 180/65.6, 68.5, 242, 243, 233

[56] References Cited

U.S. PATENT DOCUMENTS

| | | | |
|---|---|---|---|
| 2,350,459 | 6/1944 | Hillcoat et al. | 180/233 |
| 3,352,373 | 11/1967 | Tuck | 180/243 |
| 3,497,027 | 2/1970 | Wild | 180/68.5 |
| 3,690,397 | 9/1972 | Parker | 180/68.5 |
| 3,870,392 | 3/1975 | Bond | 180/68.5 |
| 4,140,194 | 2/1979 | Moreau | 180/242 |
| 4,723,624 | 2/1988 | Kawasaki et al. | 180/233 |
| 4,899,859 | 2/1990 | Teraoka | 180/233 |
| 4,987,967 | 1/1991 | Kouno | 180/233 |
| 5,441,123 | 8/1995 | Beckley | 180/68.5 |
| 5,461,568 | 10/1995 | Morita | 180/233 |
| 5,492,189 | 2/1996 | Kriegler et al. | 180/65.6 |
| 5,555,950 | 9/1996 | Harada et al. | 180/68.5 |
| 5,562,566 | 10/1996 | Yang | 180/65.6 |
| 5,713,425 | 2/1998 | Buschhaus et al. | 180/65.2 |

FOREIGN PATENT DOCUMENTS

234376   9/1960   Australia ............................... 180/242

*Primary Examiner*—J J Swann
*Assistant Examiner*—Frank Vanaman
*Attorney, Agent, or Firm*—Smith, Gambrell & Russell

[57] ABSTRACT

A drive unit for a hybrid vehicle includes: an internal combustion engine 1; a transmission 3 connected to the internal combustion engine 1 via a clutch 2; a primary differential gear 11 for distributing a driving force transmitted from the transmission 3, to primary driving wheels 17 and 18; a transfer 20 connected to the primary differential gear for taking out a part of the driving force transmitted from the transmission 3 to the primary differential gear 11; a pair of propeller shafts 26 and 27 formed by dividing two parts in axial directions for transmitting part of the driving force from the transfer to a secondary differential gear 33; an electric motor 31 provided between these propeller shafts 26 and 27; and a pair of clutches 29 and 30, each connecting the electric motor 31 to one of the pair of propeller shafts 26 and 27. Therefore, the drive unit can be used for 2WD or 4WD hybrid vehicles without changing the main components.

13 Claims, 10 Drawing Sheets

| DRIVING MODE | ENGINE | ELECTRO-MAGNETIC CLUTCH | FRONT DIFFER-ENTIAL GEAR | FIRST CLUTCH | MOTOR | SECOND CLUTCH | REAR DIFFER-ENTIAL GEAR | THIRD CLUTCH |
|---|---|---|---|---|---|---|---|---|
| ENGINE FWD DRIVING | ◎ | ○ | ○ | × | × | × | × | × |
| ENGINE 4WD DRIVING | ◎ | ○ | ○ | ○ | ○ | ○ | ○ | × |
| MOTOR FWD DRIVING | × | × | ○ | ○ | ◎ | × | × | ○ |
| MOTOR RWD DRIVING | × | × | × | × | ◎ | ○ | ○ | ○ |
| MOTOR 4WD DRIVING | × | × | ○ | ○ | ◎ | ○ | ○ | ○ |
| ENGINE+MOTOR FWD DRIVING | ◎ | ○ | ○ | ○ | ◎ | × | × | ○ |
| ENGINE+MOTOR 4WD DRIVING | ◎ | ○ | ○ | ○ | ◎ | ○ | ○ | ○ |
| REGENERATIVE BRAKE FWD DRIVING | × | × | ○ | ○ | △ | × | × | ○ |
| REGENERATIVE BRAKE RWD DRIVING | × | × | × | × | △ | ○ | ○ | ○ |
| REGENERATIVE BRAKE 4WD DRIVING | × | × | ○ | ○ | △ | ○ | ○ | ○ |
| CHARGE FWD DRIVING | ◎ | ○ | ○ | ○ | △ | × | × | ○ |
| CHARGE RWD DRIVING | ◎ | ○ | ○ | × | △ | ○ | ○ | ○ |
| CHARGE 4WD DRIVING | ◎ | ○ | ○ | ○ | △ | ○ | ○ | ○ |

◎ : OUTPUT PRODUCED  ○ : POWER TRANSMITTED  × : NO OUTPUT PRODUCED OR NO POWER TRANSMITTED
△ : ENERGY RECOVERED

| DRIVING MODE | ENGINE | ELECTRO-MAGNETIC CLUTCH | FRONT DIFFER-ENTIAL GEAR | FIRST CLUTCH | MOTOR | SECOND CLUTCH | REAR DIFFER-ENTIAL GEAR |
|---|---|---|---|---|---|---|---|
| ENGINE FWD DRIVING | ◎ | ○ | ○ | × | × | × | × |
| ENGINE 4WD DRIVING | ◎ | ○ | ○ | ○ | ○ | ○ | ○ |
| MOTOR FWD DRIVING | × | × | ○ | ○ | ◎ | × | × |
| MOTOR RWD DRIVING | × | × | × | ○ | ◎ | ○ | ○ |
| MOTOR 4WD DRIVING | × | × | ○ | ○ | ◎ | ○ | ○ |
| ENGINE+MOTOR FWD DRIVING | ◎ | ○ | ○ | ○ | ◎ | × | × |
| ENGINE+MOTOR 4WD DRIVING | ◎ | ○ | ○ | ○ | ◎ | ○ | ○ |
| REGENERATIVE BRAKE FWD DRIVING | × | × | ○ | ○ | △ | × | × |
| REGENERATIVE BRAKE RWD DRIVING | × | × | × | ○ | △ | ○ | ○ |
| REGENERATIVE BRAKE 4WD DRIVING | × | × | ○ | ○ | △ | ○ | ○ |
| CHARGE FWD DRIVING | ◎ | ○ | ○ | × | △ | × | × |
| CHARGE RWD DRIVING | ◎ | ○ | ○ | ○ | △ | ○ | ○ |
| CHARGE 4WD DRIVING | ◎ | ○ | ○ | ○ | △ | ○ | ○ |

◎ : OUTPUT PRODUCED   ○ : POWER TRANSMITTED   × : NO OUTPUT PRODUCED OR NO POWER TRANSMITTED
△ : ENERGY RECOVERED

DRIVE UNIT FOR HYBRID VEHICLE

BACKGROUND OF THE INVENTION

1. Field of the Invention

The present invention relates to a hybrid vehicle which can use an internal combustion engine and an electric motor as a power source at the same time. More specifically, the invention relates to an improvement of a drive unit for the hybrid vehicle.

2. Description of the Prior Art

In recent years, various hybrid vehicles have been proposed which can decrease the magnitude of noise and the quantity of exhaust gas by using an internal combustion engine as a power source when a high load is applied, and an electric motor as a power source when an intermediate or low load is applied.

For example, Japanese Patent Laid-Open No. 5-50865 discloses a hybrid vehicle in which an electric motor for driving the vehicle is installed in a transmission.

On the other hand, Japanese Patent Publication No. 40-29642 and Japanese Utility Model Publication No. 50-16340 disclose hybrid vehicles in which an electric motor is mounted on on intermediate portion of a propeller shaft extending between a transmission connected to an internal combustion engine and a differential gear for distributing a driving force to driving wheels.

However, the hybrid vehicles disclosed in the aforementioned Japanese Patent Laid-Open No. 5-50865 can not directly use an existing transmission designed for an automotive vehicle which uses an internal combustion engine as an exclusive power source, since the electric motor is built in the transmission. Therefore, it is required to greatly change the design of the transmission, so that a great deal of capital investment is required. In addition, the general-purpose of the electric motor itself built in the transmission is decreased by the restrictions due to the size and layout of the transmission, so as to increase the cost of the electric motor itself. Moreover, in this hybrid vehicle, the electric motor rotates even if the engine is used as the power source, so that useless energy is consumed by the rotation of the electric motor to decrease the fuel consumption.

In addition, in the hybrid vehicles described in the aforementioned Japanese Patent Publication No. 49-29642 and Japanese Utility Model Publication No. 50-16340, only primary driving wheels are driven, and these publications fail to teach a driving unit for a hybrid vehicle in which all of four wheels are driven.

SUMMARY OF THE INVENTION

It is therefore an object of the present invention to eliminate the aforementioned problems and to provide a drive unit for a hybrid vehicle, which can use an existing transmission of a vehicle having an internal combustion engine and an electric motor, and which can be easily changed between a two-wheel drive node and a four wheel drive node, even when either of the engine or the motor is selected as a power source.

In order to accomplish the aforementioned and other objects, according to one aspect of the present invention, a drive unit for a hybrid vehicle comprises: an internal combustion engine; a transmission connected to the internal combustion engine via a clutch; a differential gear for distributing a driving force transmitted from the transmission to driving wheels; a transfer mounting portion provided on the transmission for mounting thereon a transfer which is designed to be connected to the differential gear for taking out a part of the driving force transmitted form the transmission to the differential gear; and an electric motor mounted on the transfer mounting portion for driving the differential gear.

In this drive unit, in spite of the transfer mounted on the transmission for being convertible to the two-wheel drive vehicle or the four-wheel drive vehicle, an electric motor is mounted on the transmission to directly drive the differential gear. Thus, it is possible to manufacture a drive unit for a two-wheel drive hybrid vehicle by directly using a transmission for a four-wheel drive vehicle using an internal combustion engine as an exclusive power source.

According to another aspect of the present invention, a drive unit for a hybrid vehicle comprises: an internal combustion engine; a transmission connected to the internal combustion engine via a clutch; a differential gear for distributing a driving force transmitted from the transmission to driving wheels; a transfer connected to the differential gear for taking out a part of the driving force transmitted from the transmission to the differential gear; and an electric motor for driving the differential gear via the transfer.

In this drive unit, the differential gear is driven by means of the electric motor via the transfer which is mounted on the transmission for converting between the two-wheel drive vehicle and the four-wheel drive vehicle. Thus, it is possible to manufacture a drive unit for a two-wheel drive hybrid vehicle by directly using a transfer and a transmission for a four-wheel drive vehicle using an internal combustion engine as an exclusive power source.

According to a further aspect of the present invention, a drive unit for a hybrid vehicle comprises: an internal combustion engine; a transmission connected to the internal combustion engine via a clutch; a primary differential gear for distributing a driving force transmitted from the transmission to primary driving wheels; a transfer, connected to the primary differential gear, for taking out a part of the driving force transmitted from the transmission to the primary differential gear; a pair of propeller shafts formed by dividing two parts in axial directions for transmitting the part of the driving force from the transfer to a secondary differential gear and for distributing the part of the driving force to secondary driving wheels; an electric motor provided between the propeller shafts; and a pair of clutches, each connecting the electric motor to one of the pair of propeller shafts.

In this drive unit, the driving force produced by the internal combustion engine is transmitted to the transmission via the clutch to be reduced. Then, the reduced driving force is distributed to the primary driving wheels by means of the primary differential gear. In addition, the transfer is connected to the primary differential gear for taking out a part of the driving force transmitted from the transmission to the primary differential gear. The part of the driving force taken out by the transfer is transmitted to the secondary differential gear via the propeller shaft to be distributed to the secondary driving wheels. The propeller shaft is divided into two parts in axial directions, and the electric motor is provided therebetween. The electric motor is connected, via clutches, to the pair of propeller shafts thus divided, respectively.

When the driving force produced by the electric motor is transmitted to the secondary differential gear via the propeller shaft, the secondary driving wheels can be rotated, and when it is transmitted to the primary differential gear via the propeller shaft and the transfer, the primary driving wheels can be rotated.

Thus, it is possible to easily make a drive unit for a hybrid vehicle which can easily switch the driving mode between a two-wheel drive and a four-wheel drive by directly using a transfer and a transmission for a four-wheel drive vehicle using an internal combustion engine as an exclusive power source.

BRIEF DESCRIPTION OF THE DRAWINGS

The present invention will be understood from the detailed description given herebelow and from the accompanying drawings of the preferred embodiments of the invention. However, the drawings are not intended to imply limitation of the invention to these specific embodiments, but are four explanation and understanding only.

In the drawings.

DESCRIPTION OF THE PREFERRED EMBODIMENTS

Referring now to the drawings, particularly to FIGS. 1 through 10, the preferred embodiments of a hybrid vehicle, according to the present invention, will be described below.

First, referring to FIGS. 1 through 4, the first preferred embodiment of a hybrid vehicle, according to the present invention, will be described below.

Figure 1:
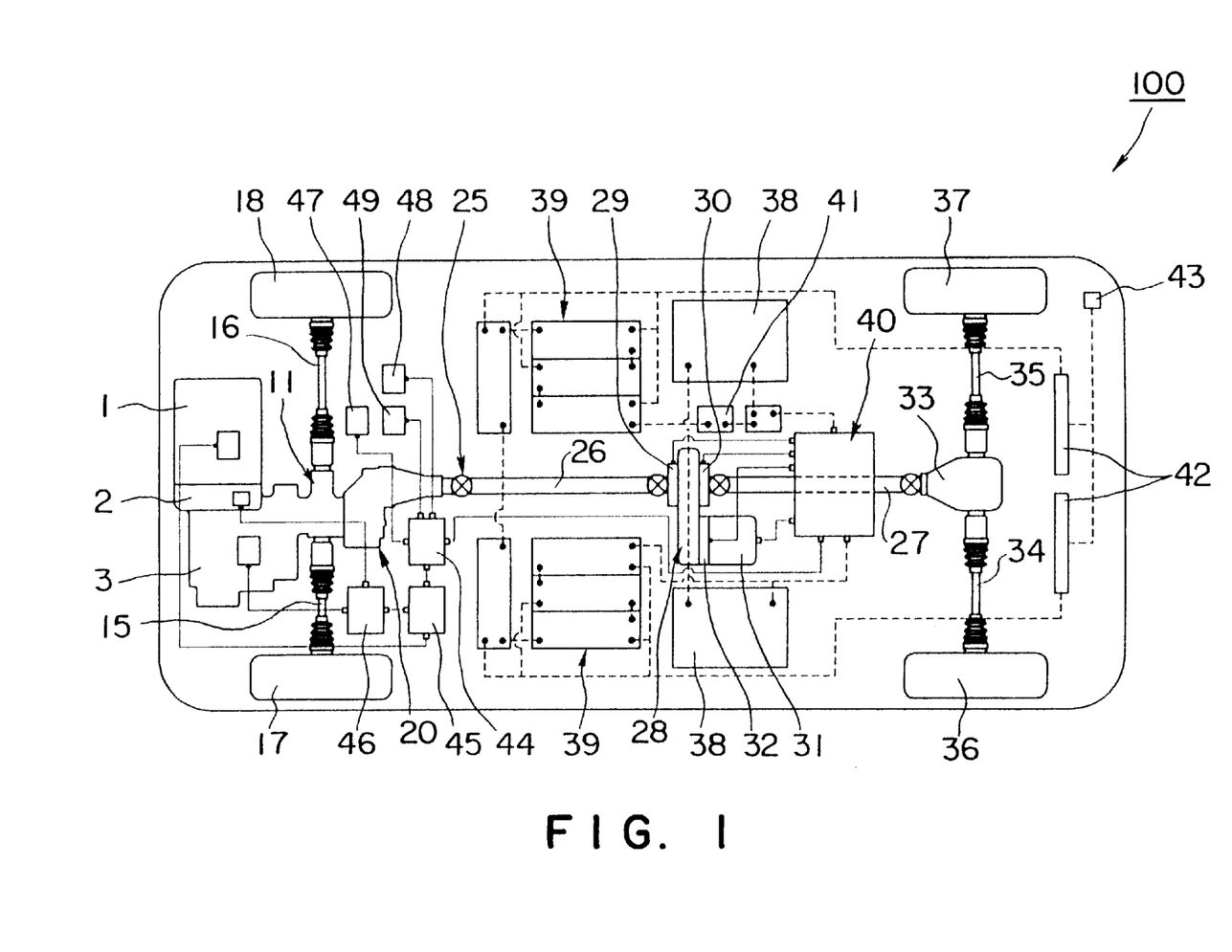
FIG. 1 is a schematic view illustrating the first preferred embodiment of a hybrid vehicle according to the present invention.

As shown in FIG. 1, a hybrid vehicle 100 has a gasoline engine 1 at the front end portion thereof. The driving force produced by the engine 1 is transmitted, via an electromagnetic clutch 2, to a continuously variable transmission (CVT) by which the driving force is changed.

Figure 2:
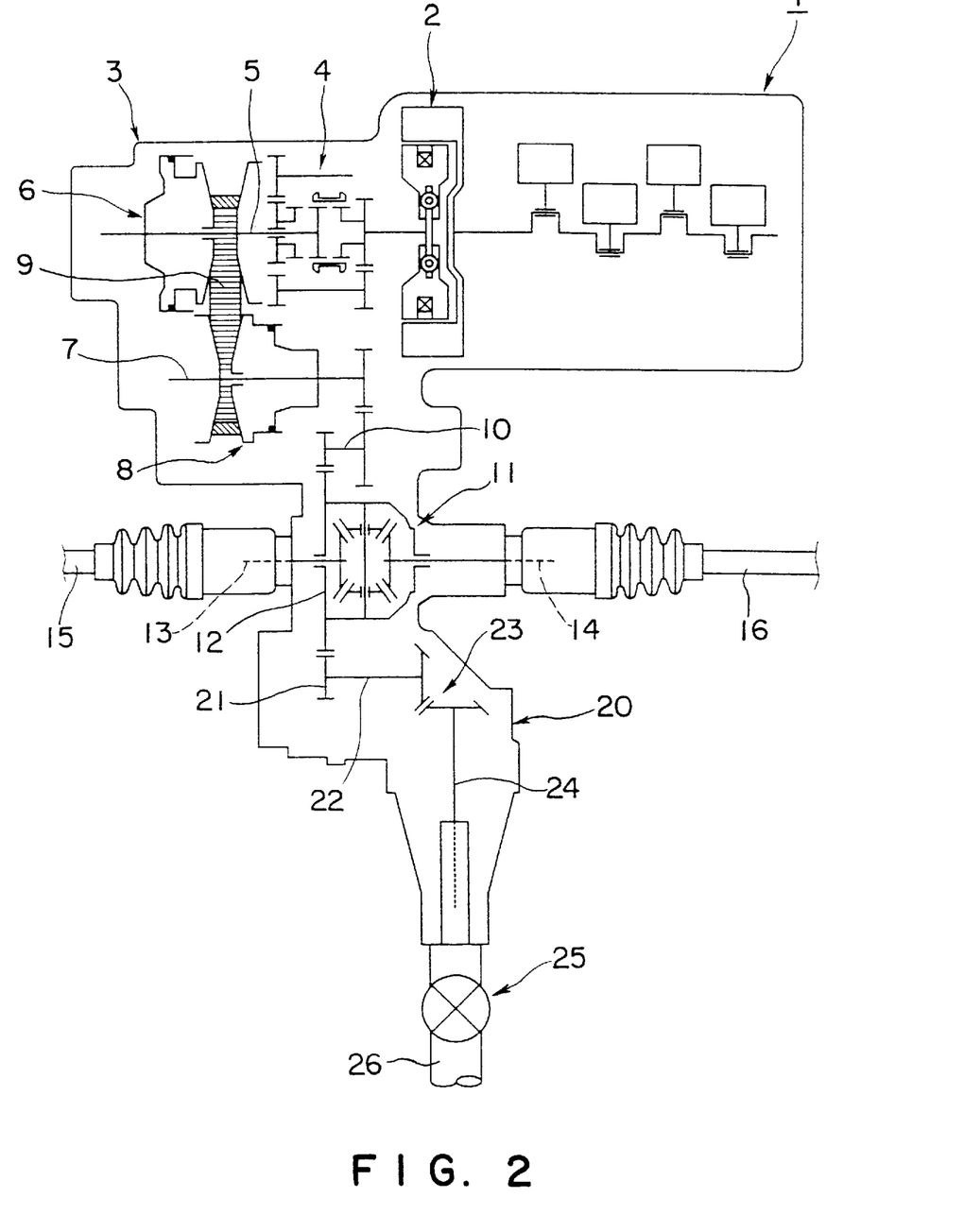
FIG. 2 is a schematic view illustrating a transmission and a transfer in the hybrid vehicle of FIG. 1.

That is, as shown in FIG. 2, the driving force is transmitted to an input shaft 5 via a front and rear switching mechanism 4 of the transmission 3. The driving force transmitted to the input shaft 5 is transmitted to an input pulley 6 rotated with the input shaft 5, and to an output shaft 7 via an endless bolt 9 which is would onto the output shaft 7 and an output pulley 8 rotated therewith. The reduction gear ratio is designed to continuously change in a stepless manner by continuously changing the widths of the grooves of the input pulley 6 and the output pulley 8 to change the effective radiuses thereof by changing an oil pressure to both pulleys.

Then, the driving force outputted from the output shaft 7 is transmitted, via an intermediate shaft 10, to a ring gear 12 for driving a front differential gear (a primary differential gear) 11. The front differential gear 11 has a pair of output shafts 13 and 14 which are spline-engaged with a pair of driving shafts, i.e. right and left driving shafts 16 and 15. Thus, the driving force outputted from the transmission 3 is distributed to the driving shafts 15 and 16 for rotating front wheels 17 and 18.

In addition, a transfer 20 is mounted on the transmission 3 at the rear end portion thereof. The transfer 20 has an input gear 21 which is directly engaged with the ring gear 12 of the front differential gear 11. Thus, a part of the driving force for rotating the front differential gear 11 is transmitted from an input shaft 21 of the transfer 20 to an output shaft 24 via a bevel gear 23, and then, transmitted to a propeller shaft 25 spline-engaged with the output shaft 24.

As shown in FIG. 1, the propeller shaft 25 is divided into two parts, i.e. a front half portion 26 and a rear half portion 27, in the forward and rearward directions. A reduction gear 28 is provided between the front and rear half portions 26 and 27 of the propeller shaft 25. To the reduction gear 28, the front half portion 26 of the propeller shaft 25 is connected via a first clutch 29, and the rear half portion 27 thereof is also connected via a second clutch 30. In addition, an electric motor 31 is mounted on the left side of the rear half portion 27 of the propeller shaft 25 so as to be connected to the reduction gear 28 via a third clutch 32.

Thus, the driving force produced by the electric motor 31 is transmitted to the reduction gear 28 via the third clutch 32 to be reduced. Then, the driving force transmitted to the reduction gear 28 is transmitted to the front half portion 26 of the propeller shaft 25 via the first clutch 29, and to the rear half portion 27 of the propeller shaft 25 via the second clutch 30.

However, the reduction gear 28 does not decrease the relative speed between those of the front and rear half portions 26 and 27 of the propeller shaft 25, so that the front and rear half portions 26 and 27 of the propeller shaft 25 are directly connected to each other when both of the first and second clutches 29 and 30 are engaged.

In addition, the rear end of the propeller shaft 25 is connected to a rear differential gear (a secondary differential gear) 33. The driving force transmitted to the rear differential gear 33 via the rear half portion 27 of the propeller shaft 25 is distributed to a pair of rear driving shafts, i.e. right and left driving shafts 35, 34, for rotating rear wheels 36 and 37.

In addition, as shown in FIG. 1, around the electric motor 31, there are closely arranged a capacitor 38 which can quickly charge and discharge electricity, a battery 39 which can discharge electricity for a long period of time, and a breaker 41 for electrically connecting the capacitor 38 and the batter 39 to a motor controller 40.

Thus, since the heavy parts such as the capacitor 38, the batter 39, the motor controller 40 are concentrated on the central portion of the hybrid vehicle 100, it is not only possible to decrease the moment of inertia in yawing directions, but also to uniformly distribute the axle load in the forward and rearward directions. In addition, since it is possible to decrease the length of electric wiring between the motor controller 40, the electric motor 31 and the first through third clutches 29, 30 and 32, it is not only possible to easily conduct the electric wiring, but also to decrease the cost of the electric wiring. Moreover, it is possible to prevent noises from entering into the electric wiring, so as to improve the reliability of the motor controller 40.

Furthermore, a battery charger 42 is connected to the batter 39 so that the battery 39 can be charged by an external power supply access connected to a plug socket 43.

Figure 3:
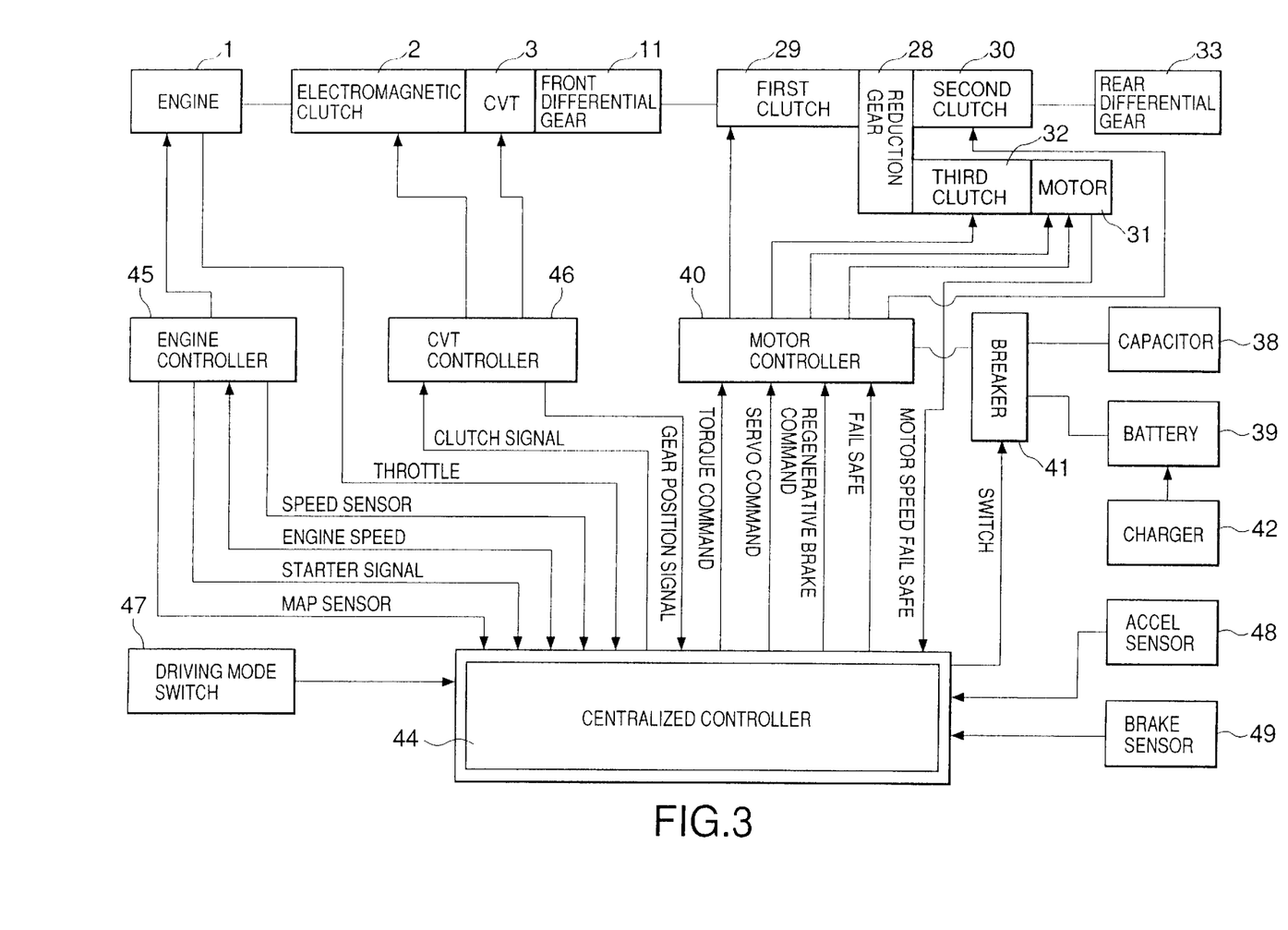
FIG. 3 is a block diagram of a control system of the hybrid vehicle of FIG. 1.

As shown in FIG. 3, the hybrid vehicle 100 is integrally controlled by a centralized controller 44. That is, the centralized controller 44 controls an engine controller 45 for controlling the engine 1; a CVT controller 46 for controlling the electromagnetic clutch 2 and the transmission (CVT) 3; and the motor controller 40 for controlling the first through third clutches 29, 30 and 32, the electric motor 31, the breaker 41 and so forth, respectively.

The centralized controller 44 controls the engine controller 45, the CVT controller 46 and the motor controller 40 on the basis of a driving mode selected by operating a driving mode switch 47 by the driver, so as to realize the selected driving mode.

Furthermore, the centralized controller 44 uses the so-called drive-by-wire system which detects the status of an accelerator pedal and a brake pedal operated by the driver through an accelerator sensor 48 and a brake sensor 49, to control the output of the engine 1 on the basis of the detected results.

Figure 4:
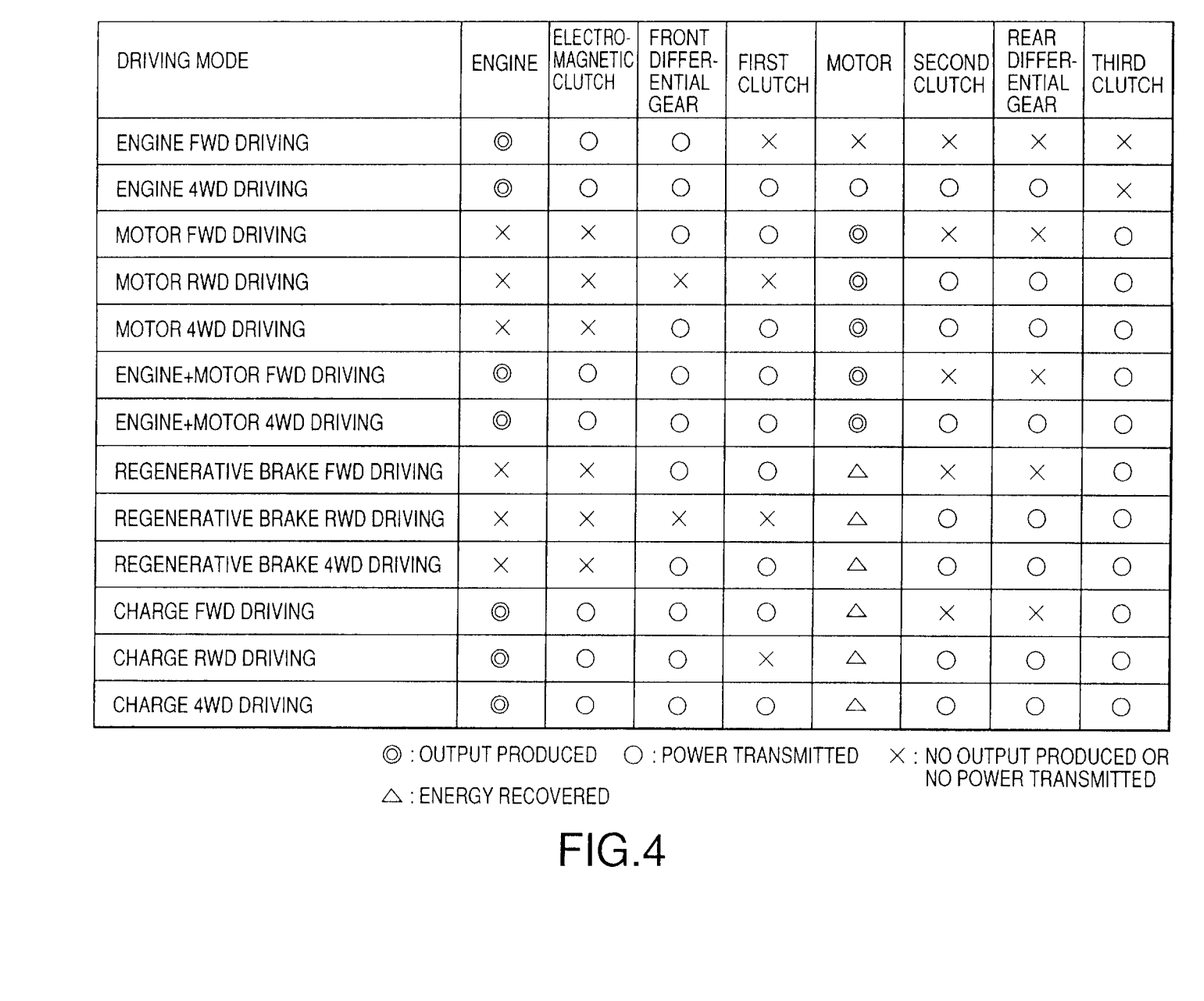
FIG. 4 is a table showing the operations of the respective parts of the hybrid vehicle of FIG. 1 in the respective driving modes.

Referring to FIG. 4, the operation of the first preferred embodiment of the hybrid vehicle 100 as constructed above will be described below.

When a high load such as a high-speed running is applied, the driving mode in which the vehicle driven by the engine 1 is selected.

When an engine FWD driving mode is selected in which the front wheels 17 and 18 are driven by the engine 1, the electromagnetic clutch 2 is turned on, and both of the first and second clutches 29, 30 are turned off. Thus, the driving force produced by the engine 1 is transmitted to the front differential gear 11 via the electromagnetic clutch 2 and the transmission (CVT) 3 to drive the front wheels 17 and 18.

At this time, a part of the driving force transmitted to the front differential gear 11 is taken out by means of the transfer 20 to rotate the front half portion 26 of the propeller shaft 25. However, since the first clutch 29 is disengaged, the reduction gear 28 is not rotated by the driving force of the engine 1. Since the second clutch 30 is also disengaged, the reduction gear 28 is not rotated by the rotation of the rear half portion 27 of the propeller shaft 25 due to the rotations of the rear wheels 36 and 37. Thus, in the engine FWD driving mode, the reduction gear 28 is not rotated, so that it can prevent energy loss from being produced.

On the other hand, when an engine 4WD driving mode is selected in which all of the four wheels, i.e. all of the front wheels 17 and 18 and the rear wheels 36 and 37, are driven by the engine 1, all of the electromagnetic clutch 2 and the first and second clutches 29, 30 are turned on. Thus, the driving force produced by the engine 1 is transmitted to the front differential gear 11 via the electromagnetic clutch 2 and the transmission 3 to drive the front wheels 17 and 18. In addition, the driving force transmitted to the front differential gear 11 is transmitted to the rear differential gear 33 via the transfer 20, the front half portion 26 of the propeller shaft 25, the first clutch 29, the reduction gear 28, the second clutch 30 and the rear half portion 27 of the propeller shaft 25, to drive the rear wheels 36 and 37.

However, since the third clutch 32 is disengaged, the electric motor 31 is not rotated, so that there is no energy loss due to the rotation of the electric motor 31.

When an intermediate or low load is applied such as when the vehicle is running in an urban area, driving by the electric motor 31 is selected. In this case, the engine 1 is stopped, and the electromagnetic clutch 2 is disengaged so as to disengage the engine 1 from the transmission 3.

When a motor FWD driving mode is selected in which the front wheels 17 and 18 are driven by the electric motor 31, the third clutch 32 and the first clutch 29 are engaged, and the second clutch 30 is disengaged. Thus, the driving force produced by the electric motor 31 is transmitted to the front differential gear 11 via the third clutch 32, the reduction gear 28, the first clutch 29, the front half portion 26 of the propeller shaft 25 and the transfer 20 to drive the front wheels 17 and 18.

In addition, when a motor RWD driving mode is selected in which the rear wheels 36 and 37 are driven by the electric motor 31, the first clutch 29 is disengaged, and both of the second and third clutches 30, 32 are engaged. Thus, the driving force produced by the electric motor 31 is transmitted to the rear differential gear 33 via the third clutch 32, the reduction gear 28, the second clutch 30 and the rear half portion 27 of the propeller shaft 25, to drive the rear wheels 36 and 37.

Moreover, when a motor 4WD driving mode is selected in which all of the four wheels, i.e. all of the front wheels 17 and 18 and the rear wheels 36 and 37, are driven by the electric motor 32, all of the first, second and third clutches 29, 30, and 32 are engaged. Thus, the driving force produced by the electric motor 31 is transmitted to the front differential gear 11 via the third clutch 32, the reduction gear 20, the first clutch 29, the front half portion 26 of the propeller shaft 25 and the transfer 20, and the driving force also is transmitted to the rear differential gear 33 via the second clutch 30 and the rear half portion 27 of the propeller shaft 25, to drive all of the four wheels, i.e. all of the front wheels 17 and 18 and the rear wheels 36 and 37.

When the maximum load is applied such as when the vehicle is climbing or quickly accelerated, the engine 1 and the electric motor 31 are used as power sources at the same time. In this case, the electromagnetic clutch 2 and the first and third clutches 29 and 32 are engaged, and the second clutch 30 is disengaged.

Thus, the driving force produced by the engine 1 is transmitted to the front differential gear 11 via the electromagnetic clutch 2 and the transmission 3 while the driving force produced by the electric motor 31 is transmitted to the front differential gear 11 via the third clutch 32, the reduction gear 28, the first clutch 29, the front half portion 26 of the propeller shaft 25 and the transfer 20. However, since the second clutch 30 is disengaged, the driving force is not transmitted to the rear half portion 27 of the propeller shaft 25, so that the rear wheels 36 and 37 are not driven.

On the other hand, when an engine plus motor 4WD driving mode is selected, the second clutch 30 is also engaged, so that the driving forces produced by the engine 1 and the electric motor 31 are transmitted to the rear differential gear 33 via the rear half portion 27 of the propeller shaft 25, so as to drive the rear wheels 36 and 37.

Even if any one of the aforementioned driving modes is selected, when it is detected by the brake sensor 49 that the brake pedal is operated by the driver, the driving mode is automatically switched into a regenerative brake driving mode by means of the centralized controller 44.

When the driving mode is switched into the regenerative brake driving mode, the electric motor 31 is connected to the front wheels 17 and 18 or the rear wheels 36 and 37 via the front or rear half portion 26 or 27 of the propeller shaft 25.

For example, as shown in the operation table of FIG. 4, although both the first and third clutches 29 and 32 are disengaged in the engine FWD driving mode, both the first and third clutches 29 and 32 are engaged when the driving mode is switched into the regenerative brake driving mode, so that the electric motor 31 is driven by the rotations of the front wheels 17 and 18.

In addition, although the third clutch 32 is disengaged in the entire 4WD driving mode, the third clutch 32 is engaged when the driving mode is switched into the regenerative brake driving mode, so that the electric motor 31 is driven by the rotations of the front wheels 17 and 18 and the rear wheels 36 and 37.

However, in the cases of the motor FWD driving mode, the motor RWD driving mode, the motor 4WD driving mode, the engine plus motor FWD driving mode and the engine plus motor 4WD driving mode, the first through third clutches 29, 30 and 32 are not switched since the electric motor 31 is connected to the front wheels 17 and 18 and/or the rear wheels 36 and 37, as appropriate for the selected mode of operation.

In the regenerative brake driving mode, the electric motor 31 serves as a generator by the rotations of the front wheels 17 and 18 and the rear wheels 36 and 37, and the obtained electric power is stored in the capacitor 38.

Furthermore, when the driving mode is switched into the regenerative brake driving mode, both the first and second clutches 29 and 30 may be engaged to drive the electric motor 31 by the rotations of both the front-wheels 17, 18 and the rear wheels 36, 37.

When it is required to charge the battery 39 while the vehicle is running, the driving mode is automatically switched into a charge mode by means of the centralized controller 44. In this state, the electric motor 312 is driven by a part of the driving force produced by the engine 1, to be operated as a generator. Then, the electric power produced by the electric motor 31 is used to charge the battery 39.

That is, as can be seen from the descriptions set forth above, in the first preferred embodiment, since the ring gear 12 of the front differential gear 11 is directly engaged with the input gear 21 of the transfer 20, it is not only possible to transmit the driving force produced by the engine 1 to the propeller shaft 25 via the transfer 20 so as to drive the rear wheels 36 and 37, but also to transmit the driving force produced by the electric motor 31 to the front differential gear 11 via the front half portion 26 of the propeller shaft 25 and the transfer 20 so as to drive the front wheels 17 and 18.

In addition, since the transmission 3 in which the transfer 20 and the front differential gear 11 are built can be directly applied to a four-wheel drive vehicle using the engine 1 as an exclusive power source, it is possible to manufacture the hybrid vehicle 100 at a very low price from an ordinary four-wheel drive vehicle having only an internal combustion engine.

Furthermore, in the firs preferred embodiment, while the transfer 20 of the hybrid vehicle 100 has been a transfer exclusively used for the so-called lock-up 4WD wherein the input shaft 22 is directly connected to the output shaft 24, the present invention should not be limited thereto, and any types of transfers may be used as long as the driving force can be transmitted from the propeller shaft 25 to the front differential gear 11. For example, a viscous coupling, a hydraulic multiple-disc clutch or the like can be provided between the input shaft 22 and the output shaft 24.

Figure 5:
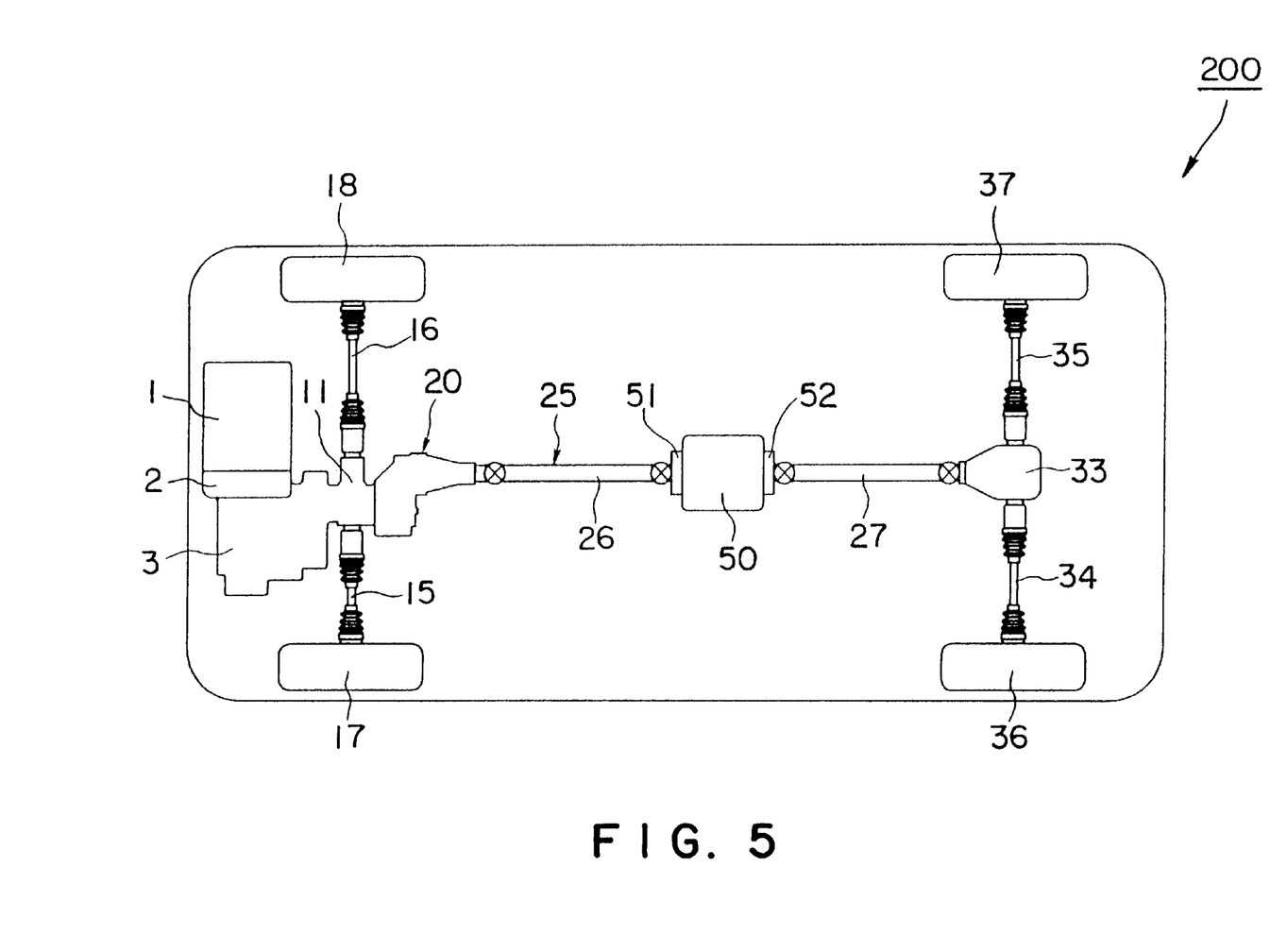
FIG. 5 is a schematic view illustrating the second preferred embodiment of a hybrid vehicle according to the present invention.
Figure 6:
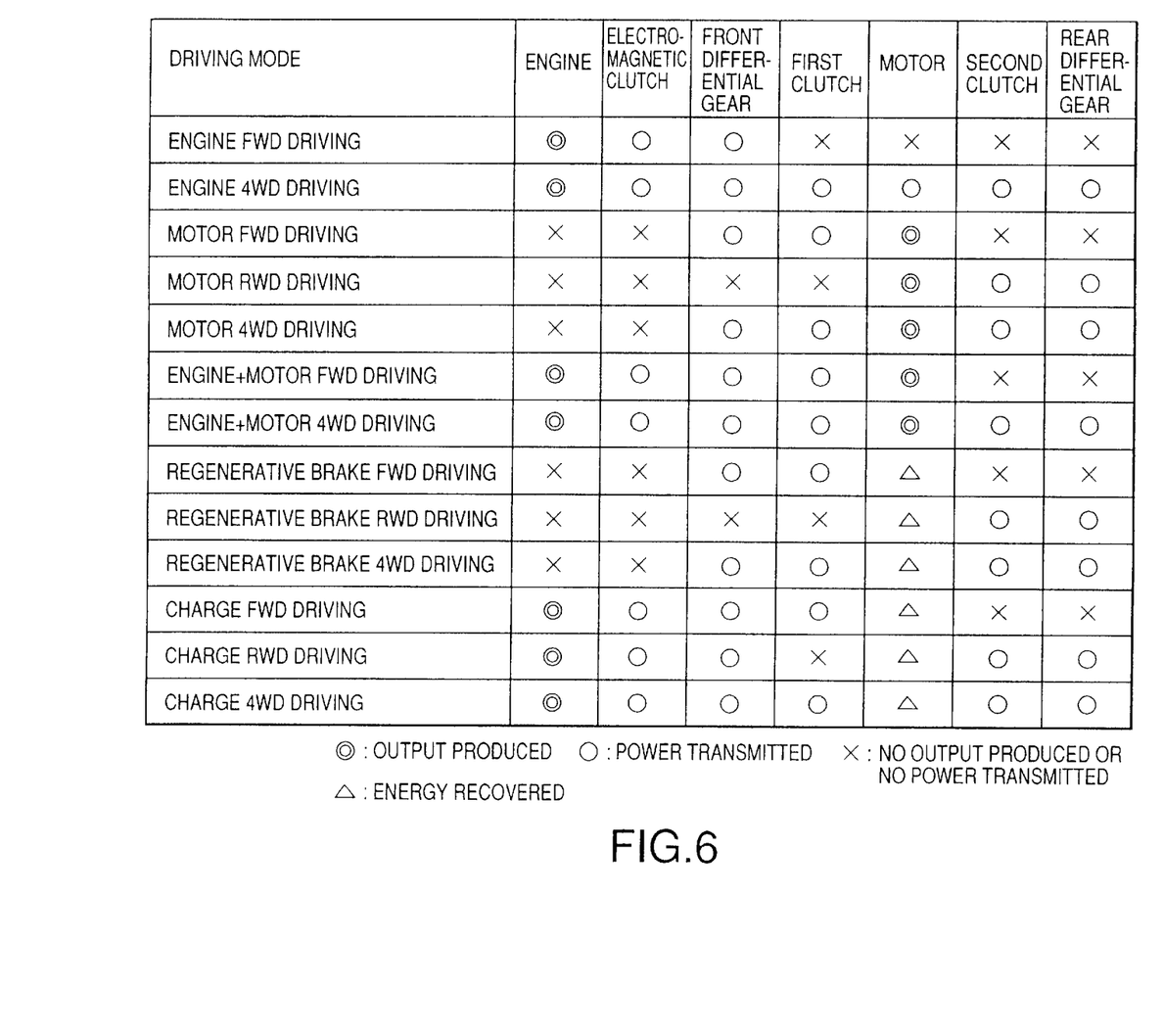
FIG. 6 is a table showing the operations of the respective parts of the hybrid vehicle of FIG. 5 in the respective driving modes.

Referring to FIGS. 5 an 6, the second preferred embodiment of the hybrid vehicle 200, according to the present invention, will be described below.

In this preferred embodiment, the hybrid vehicle 200 is the same as the hybrid vehicle 100 in the first preferred embodiment, except for the arrangements of components around the electric motor.

That is, an electric motor 50 is coaxial to the propeller shaft 25. The electric motor 50 is connected to the front half portion 26 of the propeller shaft 25 via a first clutch 51, and to the rear half portion 27 of the propeller shaft 25 via a second clutch 52. In addition, the electric motor 50 has no reduction gear.

According to the operation table as shown in FIG. 6, the hybrid vehicle 200 is operated in substantially the same manner as that of the hybrid vehicle 100. In this case, since the electric motor 50 is designed to slip in the case where the engine 4WD drive mode is selected, there is energy loss. However, since the hybrid vehicle 200 does not have the reduction gear 28 and the third clutch 32, it can be small and light in comparison with the hybrid vehicle 100 in the first preferred embodiment.

Figure 7:
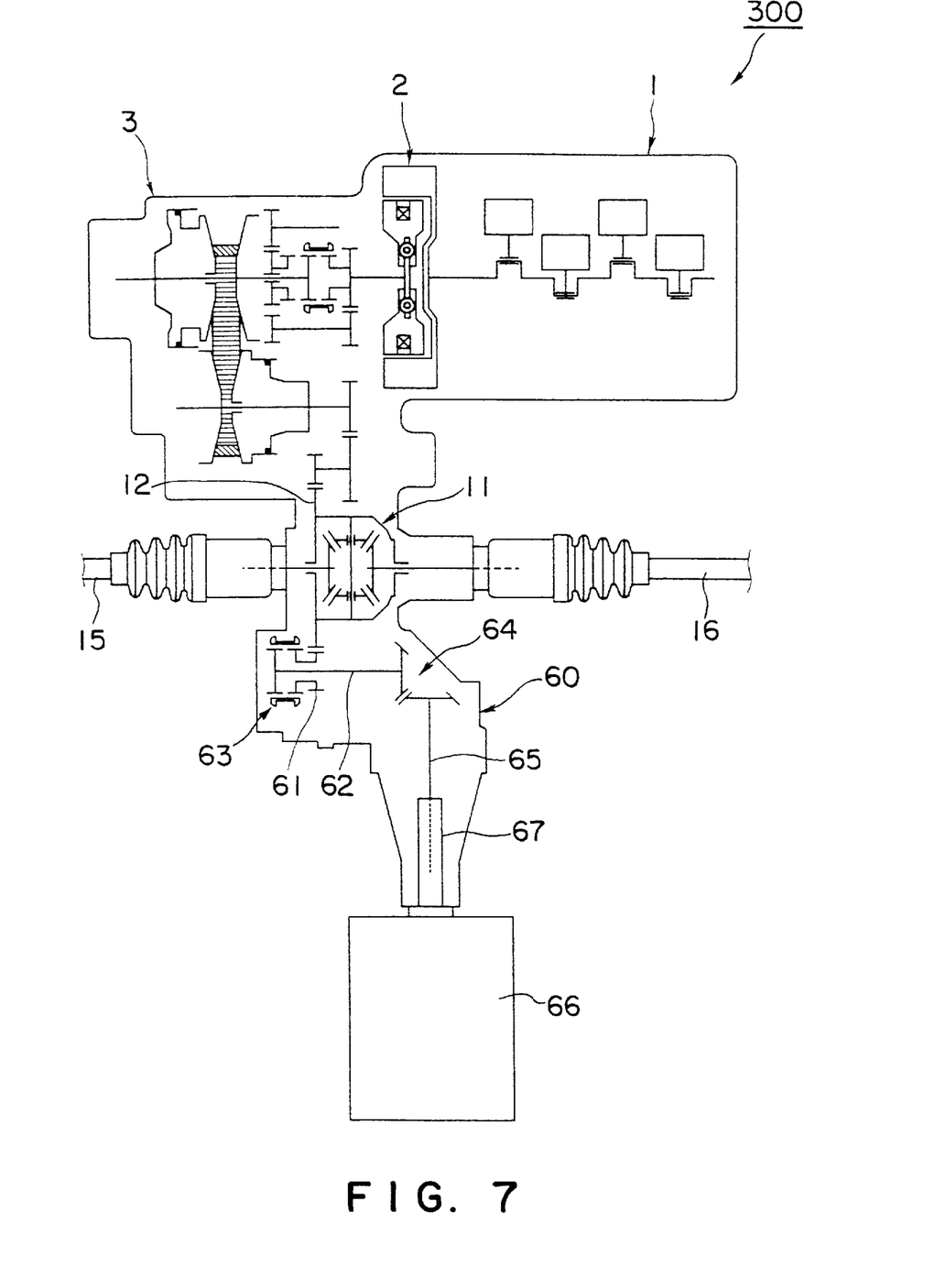
FIG. 7 is a schematic view illustrating a transmission and a transfer in the third preferred embodiment of a hybrid vehicle according to the present invention.

Referring to FIG. 7, the third preferred embodiment of a hybrid vehicle 300, according to the present invention, will be described below.

This hybrid vehicle 300 is a two-wheel drive vehicle in which the driving force produced by the engine 1 is transmitted to the transmission 3 via the electromagnetic clutch 2. The driving force converted by the transmission 3 is transmitted to the differential gear 11 to be distributed to the pair of driving shafts 15 and 16 to drive driving wheels (not shown).

A transfer 60 is mounted on the transmission 3. The transfer 60 has an input gear 61 which is directly engaged with the ring gear 12 of the differential gear 11. In addition, a clutch 63 is provided between the input gear 61 and an input shaft 62. The clutch 63 is provided for switching the driving mode between two-wheel drive and four-wheel drive when the transfer 60 is mounted on a transmission for a four-wheel drive vehicle. When the clutch 63 is engaged, part of the driving force transmitted from the transmission 3 to the differential gear 11 can be taken into the input shaft 62.

In addition, on output shaft 65 is connected to the input shaft 62 via a bevel gear 64, and an output shaft 67 of an electric motor 66 is spline-engaged with the output shaft 65.

When the vehicle 300 runs only using the engine 1 as a power source, the clutch 63 of the transfer 60 is disengaged to disconnect the differential gear 11 from the electric motor 66. Thus, the slip of the electric motor 66 is stopped, so that it is possible to prevent energy loss from being produced while the vehicle is running by the engine.

On the other hand, when the vehicle runs using the electric motor 66 as a power source, the electromagnetic clutch 2 is disengaged to disconnect the transmission 3 from the engine 1, and the clutch 63 of the transfer 60 is engaged. Thus, the driving force produced by the electric motor 66 is transmitted to the ring gear 12 of the differential gear 11 to drive the pair of driving shafts 15 and 16.

Furthermore, in the case where the regenerative brake driving mode is used, the clutch 63 of the transfer 60 is engaged, so that the electric motor 66 is driven by the differential gear 11. In this case, the electric motor 66 serves as a generator, and the obtained electric power is used for charging a battery (not shown).

That is, since the hybrid vehicle 300 in the third preferred embodiment directly uses the transfer 60 and the transmission 3 for a four-wheel drive vehicle having an engine as an exclusive power source, so as to be constructed as a two-drive hybrid vehicle using an electric motor together with the engine as power sources, the hybrid vehicle 300 can be manufactured at a low price.

In addition, since the electric motor 66 is mounted outside of the transmission, there is no restriction due to the transmission 3. Thus, it is possible to use an inexpensive motor having a wide general-purpose, so that the hybrid vehicle 300 can be manufactured at a lower cost.

Figure 8:
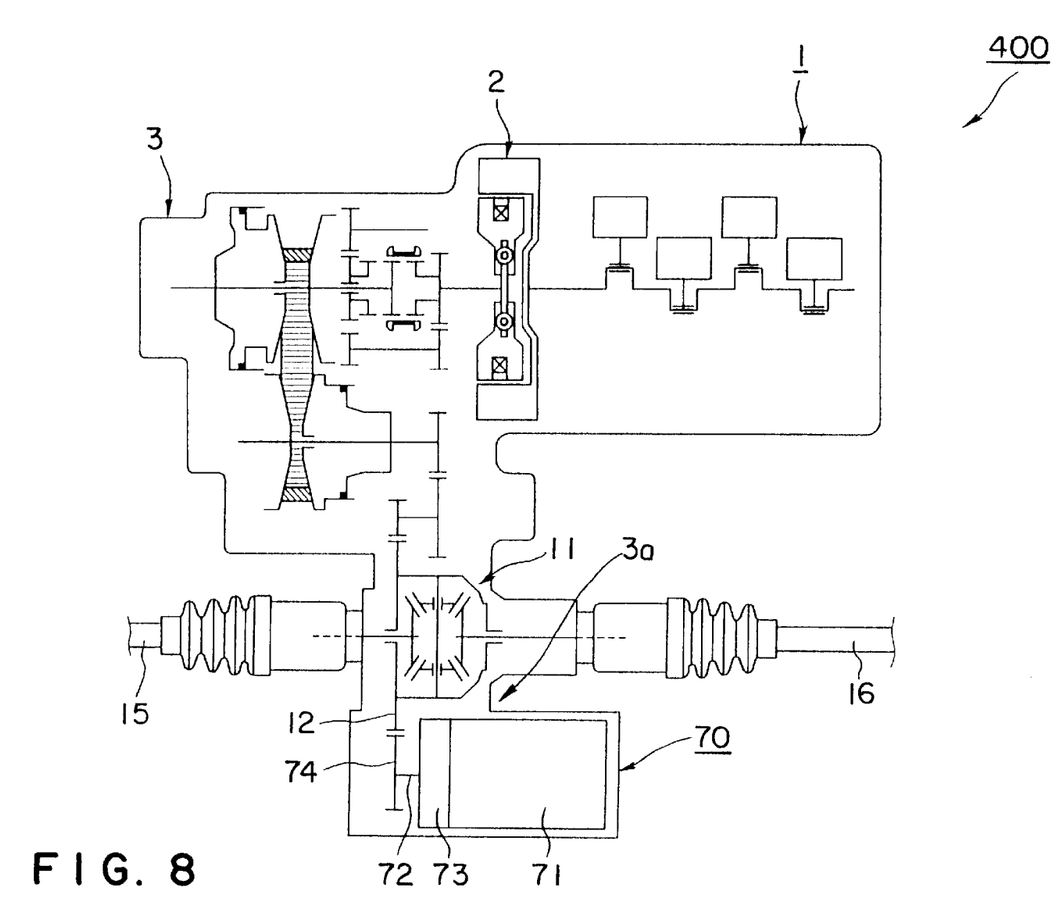
FIG. 8 is a schematic view illustrating a transmission and a transfer in the fourth preferred embodiment of a hybrid vehicle according to the present invention.

Referring to FIG. 8, the fourth preferred embodiment of a hybrid vehicle 400, according to the present invention, will be described below.

This hybrid vehicle 400 is a two-wheel drive vehicle in which the driving force produced by the engine 1 is transmitted to the transmission 3 via the electromagnetic clutch 2, and the driving force converted by the transmission 3 is transmitted to the differential gear 11 to drive the pair of driving wheels 15 and 16.

In addition, the transmission 3 has a transfer mounting portion 3a on which a transfer used for causing a two-wheel drive vehicle to serve as a four-wheel drive vehicle can be mounted. On the transfer mounting portion 3a of the transmission 3, an electric motor housing 70 is mounted in place of the transfer. In the electric motor housing 70, an electric motor 71 and a clutch 73 provided between the motor body and the output shaft 72 of the electric motor 71 are built. An output gear 74 mounted on the output shaft 72 is directly engaged with the ring gear 12 of the differential gear 11.

Thus, the driving force produced by the electric motor 71 is transmitted to the differential gear 11 via the output gear 74, to drive the pair of driving shafts 15 and 16 so as to rotate driving wheels (not shown).

When the vehicle runs only using the engine 1 as a power source, the clutch 73 is disengaged, and the differential gear 11 is disconnected from the electric motor 71. Thus, when the vehicle runs by the engine, the slip of the electric motor 71 is stopped to prevent energy loss from being produced.

Furthermore, in the case where the regenerative brake driving mode is selected the clutch 73 is engaged, and the electric motor 71 is driven by the differential gear 11. The electric motor 71 serves as a generator, and the obtained electric power is used for charging a battery (not shown).

That is, in the fourth preferred embodiment, since the differential gear 11 is directly driven by the electric motor 71, its structure can be exceedingly simple. In addition, since the electric motor 71 is mounted on the transfer mounting portion of the transmission 3 while being built in the electric motor housing 70, it is possible to directly use the existing transmission 3, so that the hybrid vehicle 400 can be manufactured at a low cost.

Figure 9:
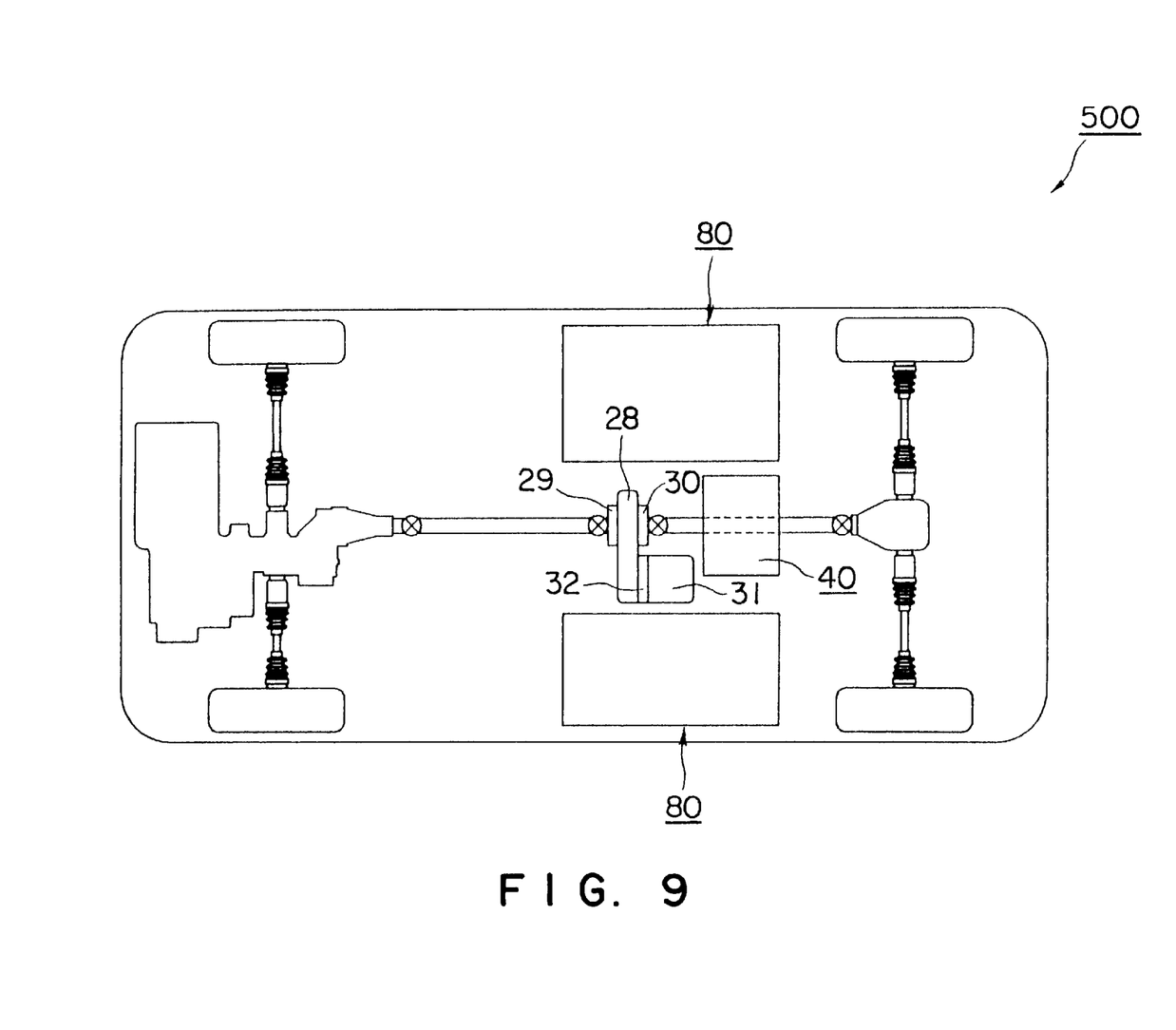
FIG. 9 is a schematic view illustrating the arrangements of a battery and so forth in the fifth preferred embodiment of a hybrid vehicle according to the present invention.

Referring to FIG. 9, the fifth preferred embodiment of a hybrid vehicle 500, according to the present invention, will be described.

In this hybrid vehicle 500, the arrangements of the capacitor 38 and the batter 39 in the aforementioned first preferred embodiment are changed.

That is, in the hybrid vehicle 500, one capacitor and one battery for supplying electrical power to the electric motor 31 are integrally housed in a package 80 so as to be arranged on the right and left sides of the electric motor 31.

Thus, since the heavy battery and capacitor can be arranged so as to be concentrated on the central portion of the vehicular body, it is not only possible to decrease the moment of inertia in yawing directions of the hybrid vehicle 500, but also to obtain a suitable weight distribution between the front and rear shafts. In addition, since it is possible to decrease the length of the electric wiring between the battery and the capacitor, the wiring operation can be easily carried out and the cost for the electric wiring can be decreased. Moreover, since the capacitor and the battery are packaged, they can be easily mounted on the vehicle body.

Figure 10:
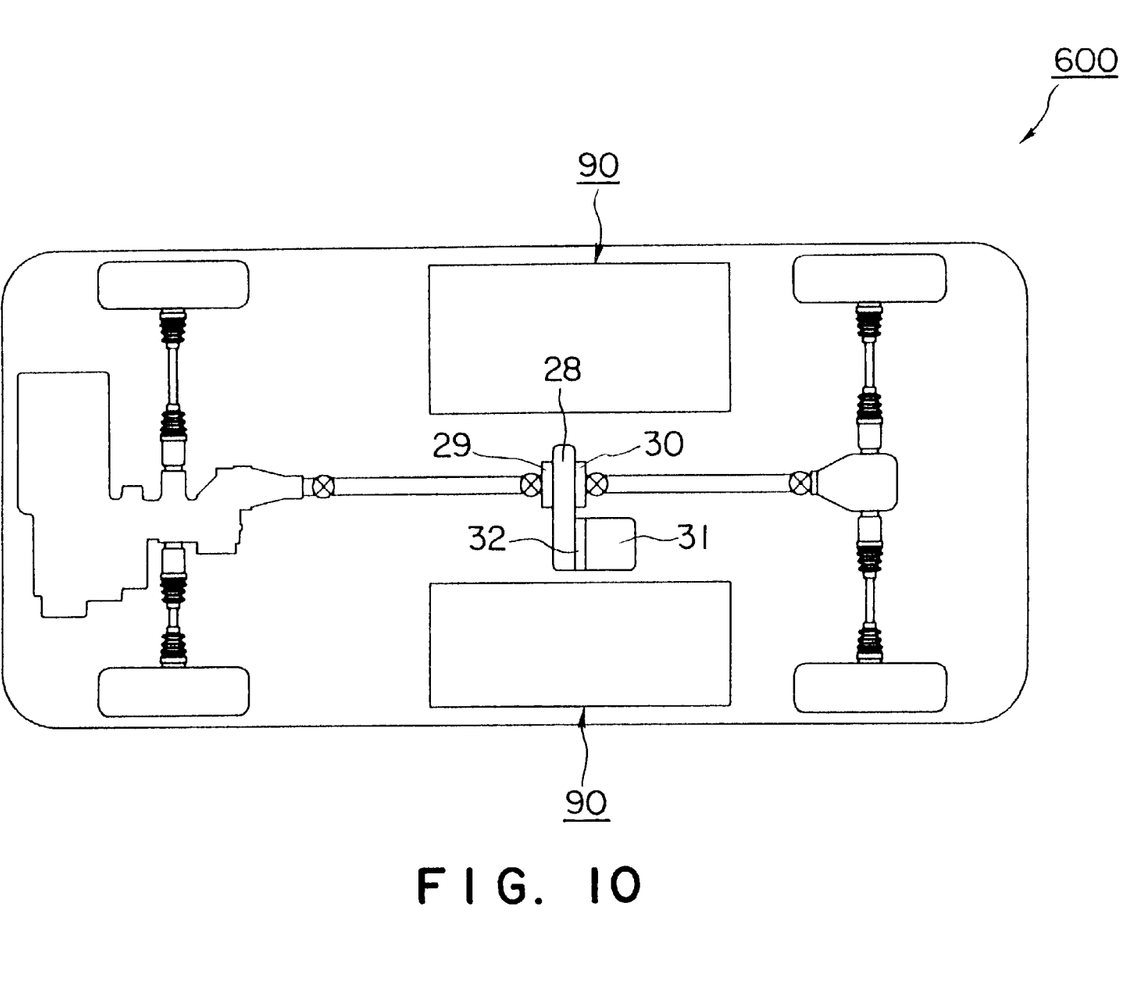
FIG. 10 is a schematic view illustrating the arrangements of a battery and so forth in the sixth preferred embodiment of a hybrid vehicle according to the present invention.

Referring to FIG. 10, the sixth preferred embodiment of a hybrid vehicle 600, according to the present invention, will be described below.

This hybrid vehicle 600 is an improvement of the hybrid vehicle 500 in the afore-mentioned fifth preferred embodiment.

That is, in this hybrid vehicle 600, the battery and the capacitor for supplying electric power to the electric motor 31, as well as a controller for controlling the electric motor 31 and so forth, are integrally built in a package 90.

Thus, since the heavy battery and capacitor can be arranged to be concentrated on the central portion of the vehicle body, it is not only possible to decrease the moment of inertia in yawing directions of the hybrid vehicle 600, but also to obtain a suitable weight distribution between the front and rear shafts. In addition, since it is possible to decrease the length of the electric wiring between the battery and the capacitor, the wiring operation can be easily carried out and the cost for the electric wiring can be decreased.

Moreover, since the controller for controlling the operations of the electric motor 31 and so forth is arranged so as to be close to the electric motor, the battery, the capacitor and so forth, it is possible to decrease the length of the electric wiring for connecting these components. Thus, it is possible to prevent noise signals from entering into the electric wiring from the outside, so that it is possible to improve the reliability of the controller upon the control of the electric motor.

While the preferred embodiments of a hybrid vehicle, according to the present invention, have been described above, the present invention should be not limited thereto, and various modifications may be made.

For example, in the aforementioned preferred embodiments, while the hybrid vehicle has been based on a front wheel drive vehicle in which the engine 1 is mounted on the front end portion of the vehicle body, the present invention may be applied to a hybrid vehicle based on a rear wheel drive vehicle in which the engine 1 is mounted on the rear end portion of the vehicular body.

As mentioned above, according to the present invention, it is possible to directly use a transmission, a transfer and so forth of an automotive vehicle using an internal combustion engine as an exclusive power source, so as to form a drive unit for a hybrid vehicle. Thus, since it is not required to newly manufacture transmissions, transfers and so forth, it is possible to prevent the necessity of a great deal of capital investment and the increase of cost, so that it is possible to manufacture a hybrid vehicle in an exceedingly low cost.

In addition, in the drive unit of the hybrid vehicle of the present invention, since the electric motor is mounted outside of the transmission, the electric motor is not restricted by the size, layout and so forth of the transmission. Thus, it is possible to use an inexpensive and high-performance electric motor having wide general-purpose.

In addition, according to the drive unit of the hybrid vehicle of the present invention, if either of the internal combustion engine or the electric motor is selected as a power source, it is possible to easily switch the driving mode between a two-wheel drive and a four wheel drive. Thus, it is possible to select the optimum driving mode based on the driving condition, so that the driving performance of the hybrid vehicle can be maximally obtained.

In addition, in the drive unit of the hybrid vehicle of the present invention, since the heavy parts such as a battery and a motor are arranged so as to be concentrated on the central portion of the vehicle body, it is not only possible to decrease the moment of inertia in the yawing directions, but also to obtain a suitable weight distribution between the front and rear shafts.

Moreover, since the controller for controlling the operation of the electric motor is arranged so as to be close to the electric motor, the battery and so forth, it is possible to decrease the length of the electric wiring for connecting these parts. Thus, since it is possible to prevent external noises from entering the electric wiring, it is possible to enhance the reliability of the controller upon the controls of the electric motor and so forth.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a driving force transmitting system that modifies a conventional four-wheel drive vehicle to a two-wheel drive hybrid vehicle, wherein the conventional four-wheel drive vehicle includes (a) an internal combustion engine for generating a driving force, (b) a transmission connected to the engine via a clutch, (c) a first differential mechanically connected to the transmission and provided to absorb a speed difference between a first pair of left and right wheels, and (d) a transfer unit mounting portion provided outside the transmission, wherein the improvement comprises:

an electric motor mounted on the transfer unit mounting portion in place of a transfer unit, wherein the electric motor is operatively connected, via the first differential, to drive the first pair of left and right wheels, and wherein the hybrid vehicle operates in a two-wheel drive operating mode, wherein the first pair of left and right wheels are driven by the internal combustion engine, the electric motor, or both.

2. The driving force transmitting system according to claim 1, wherein the electric motor includes a reduction gear for reducing the motor speed, an output shaft operatively engaged with the first differential, and a motor clutch for engaging the reduction gear with the output shaft.

3. The driving force transmitting system according to claim 1, wherein the clutch that connects the internal combustion engine with the transmission is an electromagnetic clutch.

4. The driving force transmitting system according to claim 1, wherein the transmission is a continuously variable transmission.

5. The driving force transmitting system according to claim 1, further including a capacitor and a battery, located in a central portion of the hybrid vehicle and operatively connected to supply electric power to the electric motor.

6. A driving force transmitting system for a hybrid vehicle having (a) an internal combustion engine for generating a driving force, (b) a transmission connected to the engine via a clutch, and (c) a first differential operatively connected to the transmission and provided to absorb a speed difference between a first pair of left and right wheels, the driving force transmitting system comprising:

a transfer unit operatively connected to the first differential and provided with an output shaft to transmit driving force to a second pair of left and right wheels, to drive the vehicle in a four-wheel drive mode, wherein, in the four-wheel drive mode, the internal combustion engine exclusively provides driving force to drive both the first pair of left and right wheels and the second pair of left and right wheels;

an electric motor located outside the transmission and directly connected to the output shaft of the transfer unit when the vehicle is operated in a two-wheel drive mode, wherein the electric motor is operatively connected to drive the first pair of right and left wheels by driving the output shaft of the transfer unit, and wherein the electric motor drives the vehicle only in the two-wheel drive mode.

7. The driving force transmitting system according to claim 6, wherein the electric motor includes a reduction gear for reducing the motor speed, a motor output shaft operatively engaged with the output shaft of the transfer unit, and a motor clutch for engaging the reduction gear with the motor output shaft.

8. The driving force transmitting system according to claim 6, wherein the clutch that connects the internal combustion engine with the transmission is an electromagnetic clutch.

9. The driving force transmitting system according to claim 6, wherein the transmission is a continuously variable transmission.

10. The driving force transmitting system according to claim 6, further including a capacitor and a battery, located in a central portion of the hybrid vehicle and operatively connected to supply electric power to the electric motor.

11. The driving force transmitting system according to claim 6, wherein the transfer unit includes an input shaft coupled to the output shaft of the transfer unit via a viscous coupling.

12. The driving force transmitting system according to claim 6, wherein the transfer unit includes a transfer clutch for connecting the transfer unit to the first differential.

13. The driving force transmitting system according to claim 12, wherein the transfer clutch is a hydraulic multiple-disc clutch.

* * * * *